United States Patent Office.

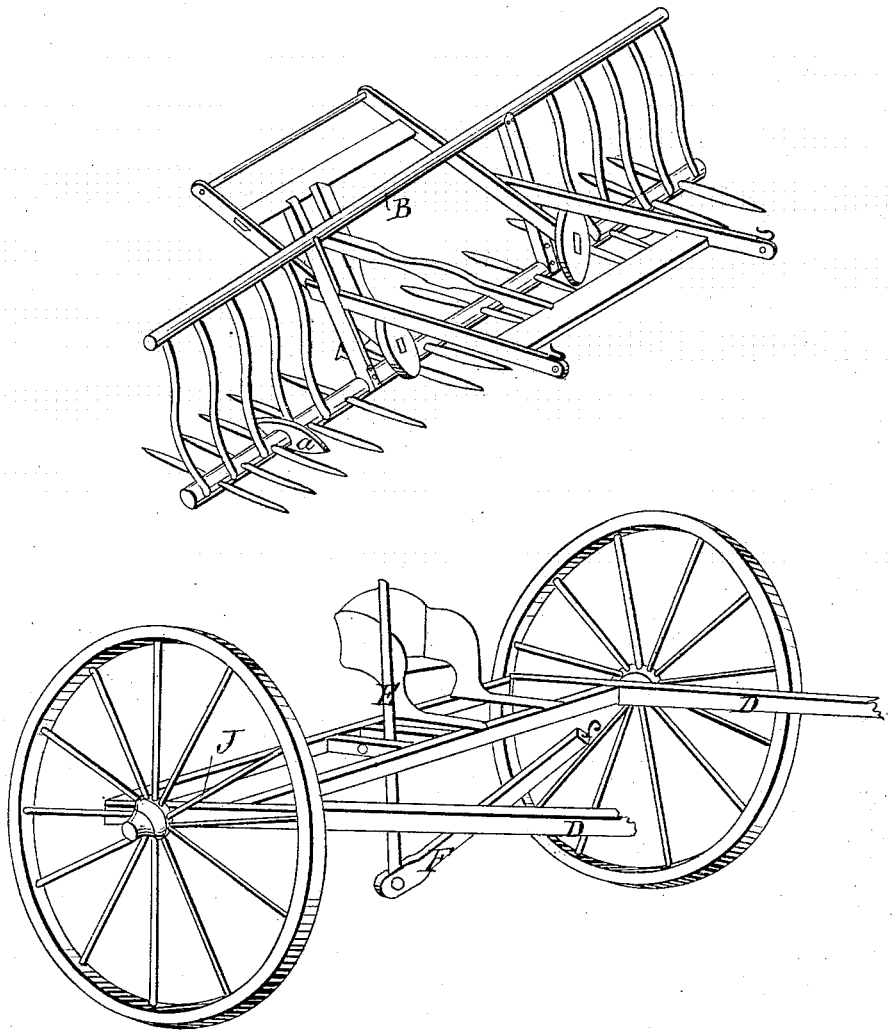

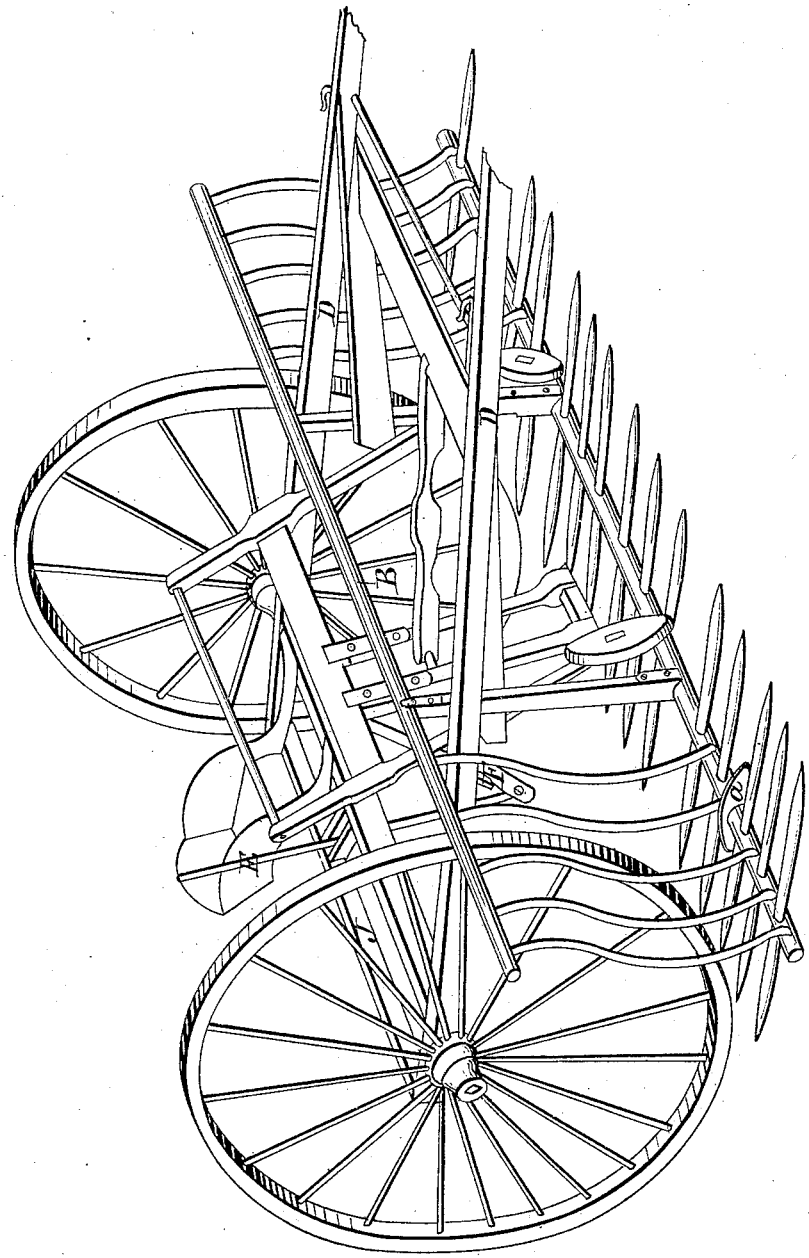

ABNER CHAPMAN, OF DELTA, NEW YORK.

Letters Patent No. 73,952, dated February 4, 1868.

IMPROVEMENT IN HORSE-RAKES.

The Schedule referred to in these Letters Patent and making part of the same.

Be it known that I, ABNER CHAPMAN, of Delta, in the county of Oneida, and State of New York, have invented a new and useful Improvement on the Common Wooden Revolving Horse-Rake; and I do hereby declare that the following is a full and exact description of the construction and operation of the same, reference being had to the annexed drawing, making a part of this specification, in which—

Figure 1 is a perspective view.

My improvement consists in a segment of a circle and a grain-head, applied to the common wooden revolving horse-rake.

I have a segment of a circle that is attached to each end, or about one-third of the way from the centre of the head, placed in the centre, betwixt the teeth. This segment of a circle is made of inch and a half plank, and is about seventeen inches long and eight inches through the centre, with a mortise in the centre to receive the head of the rake, and is banded with iron. With a segment of a circle applied to the rake-head it can be elevated so as to pass over any obstacle that is in the way, and can be drawn from one field to another without being loaded in a wagon, and is much easier handled in rough or uneven meadows; and the rake is elevated so that the dust does not come in contact with the head, and it leaves the hay and grain clean from the dust or dirt that is carried with the rake-head that is drawn on the ground in the usual way; and my improvement in the grain-head consists of a top head applied to the arms of a common revolving horse-rake, marked B, and when so applied, the teeth of the grain-head will extend to the main head of the rake, and the lower end of the teeth to the grain-head are placed betwixt the teeth of the main head, and in front of the head. They should run down to the centre of the main head, and the arms of the rake should be about two feet long, so as to allow the main head to revolve, with a mortise to receive the grain-head. The grain-head is made the same length of the main head, with circular teeth, something like a sickle. They can be made of any suitable material. This grain-head can be taken off from the main rake at leisure.

With my grain-head applied to a common revolving horse-rake, I am able to rake grain into sheaves or bundles, two swaths at a time, which has never been done with a common horse-rake before. The lower head or teeth go under the swath, and the top teeth hold the grain until the bundle is sufficiently large to suit the operator.

Claim.

What I claim as my improvement, and desire to secure by Letters Patent, is—

A grain-head, applied to the arms of a revolving horse-rake, marked B, in the manner and for the purpose herein set forth.

ABNER CHAPMAN.

Witnesses:
ALANSON TAFT,
EDWIN A. TAFT.